(12) United States Patent
Yamana

(10) Patent No.: US 11,293,807 B2
(45) Date of Patent: Apr. 5, 2022

(54) SHEATHED THERMOCOUPLE AND METHOD FOR MANUFACTURING SHEATHED THERMOCOUPLE

(71) Applicant: OKAZAKI MANUFACTURING COMPANY, Hyogo (JP)

(72) Inventor: Masaru Yamana, Hyogo (JP)

(73) Assignee: OKAZAKI MANUFACTURING COMPANY, Hyogo (JP)

( * ) Notice: Subject to any disclaimer, the term of this patent is extended or adjusted under 35 U.S.C. 154(b) by 0 days.

(21) Appl. No.: 16/617,459

(22) PCT Filed: Aug. 1, 2019

(86) PCT No.: PCT/JP2019/030118
§ 371 (c)(1),
(2) Date: Oct. 22, 2020

(87) PCT Pub. No.: WO2020/213182
PCT Pub. Date: Oct. 22, 2020

(65) Prior Publication Data
US 2021/0333155 A1 Oct. 28, 2021

(30) Foreign Application Priority Data
Apr. 16, 2019 (JP) .............................. JP2019-078074

(51) Int. Cl.
*G01K 1/00* (2006.01)
*G01K 7/00* (2006.01)
(Continued)

(52) U.S. Cl.
CPC ................. *G01K 1/08* (2013.01); *G01K 7/06* (2013.01)

(58) Field of Classification Search
USPC ........................................ 374/179, 208, 148
See application file for complete search history.

(56) References Cited

U.S. PATENT DOCUMENTS

| 6,102,565 A | 8/2000 | Kita et al. |
| 2016/0134047 A1 | 5/2016 | Nishikawa et al. |

FOREIGN PATENT DOCUMENTS

| DE | 4017968 C2 * 12/1992 | ............... G01K 7/02 |
| DE | 102010016760 A1 * 11/2011 | ............. H01L 35/32 |

(Continued)

OTHER PUBLICATIONS

Extended European search report issued by the European Patent Office dated Jul. 3, 2020, which corresponds to European Patent Application No. 19801464.9-1001 and is related to U.S. Appl. No. 16/617,459.

(Continued)

*Primary Examiner* — Mirellys Jagan
(74) *Attorney, Agent, or Firm* — Studebaker & Brackett PC

(57) ABSTRACT

A sheathed thermocouple includes thermocouple wires; a metal sheath accommodating the thermocouple wires; inorganic insulating material powder filled in an internal space of the metal sheath; a glass seal part tightly sealing an opening of the metal sheath while allowing the thermocouple wires to pass; compensation lead wires connected to the thermocouple wires; a metal sleeve having a cylindrical shape having a leading end part defining a connecting section connected with an outer peripheral surface of the metal sheath, and allowing a portion of the metal sheath closer to a proximal end than the connecting section, the thermocouple wires and the compensation lead wires to be in an internal space, the thermocouple wires and the compensation lead wires lying without contact between themselves; and a glass filler part made of a glass having a lower softening temperature than the glass seal part, and filling an internal space of the metal sleeve.

8 Claims, 4 Drawing Sheets

(51) Int. Cl.
    *G01K 1/08*     (2021.01)
    *G01K 7/06*     (2006.01)

(56) References Cited

FOREIGN PATENT DOCUMENTS

| | | | |
|---|---|---|---|
| GB | 2554350 A * | 4/2018 | ............... G01K 7/04 |
| JP | S47-008868 B1 | 3/1972 | |
| JP | S57-133328 A | 8/1982 | |
| JP | H11-166867 A | 6/1999 | |
| JP | 2004-045334 A | 2/2004 | |
| JP | 5420809 B1 | 2/2014 | |
| WO | 2014/125078 A1 | 8/2014 | |
| WO | WO-2019151165 A1 * | 8/2019 | ............. G01K 13/02 |

OTHER PUBLICATIONS

Written Opinion issued in PCT/JP2019/030118; dated Oct. 8, 2019.

* cited by examiner (CROSS SECTIONAL VIEW TAKEN ALONG LINE A-A)

(CROSS SECTIONAL VIEW
TAKEN ALONG LINE C-C)

SHEATHED THERMOCOUPLE AND METHOD FOR MANUFACTURING SHEATHED THERMOCOUPLE

TECHNICAL FIELD

The present invention relates to a sheathed thermocouple and a method for manufacturing a sheathed thermocouple. Particularly, the present invention relates to a sheathed thermocouple suitably useable in a high radioactive environment and a vacuum environment, and a method for manufacturing such a sheathed thermocouple.

BACKGROUND ART

In a sheathed thermocouple, thermocouple wires in a metal sheath are kept away from the air by tightly sealing an opening at a proximal end of the metal sheath having a cylindrical shape and a closed distal end. Thus, the thermocouple wires will not be corroded or oxidized even in use of the thermocouple at a high temperature. Therefore, the sheathed thermocouple has the characteristic feature that it can be used for a long time without deteriorating the temperature measurement accuracy. Such sheathed thermocouples have been widely used as temperature sensors for plants, factories, and the like.

FIG. 4 shows a configuration of a most conventional sheathed thermocouple 10. FIG. 4A is a longitudinal cross-sectional view. FIG. 4B is a cross sectional view taken along the line C-C in FIG. 4A. The direction D denoted by the arrow in FIG. 4A is a direction from a proximal portion to a distal portion of each component of the sheathed thermocouple 10.

The sheathed thermocouple 10 includes: a pair of thermocouple wires 3 consisting of a positive thermocouple wire 31 and a negative thermocouple wire 32; a metal sheath 2; inorganic insulating material powder 5; a metal sheath resin seal 60; a pair of compensation lead wires 9 which transmit a thermally electromotive force of the thermocouple wires 3 to a measurement receiver; a metal sleeve 7; and a resin filler part 80.

The pair of thermocouple wires 3 have distal ends joined to each other to form a temperature measuring part 4. The metal sheath 2 has a cylindrical shape having an opening 20 at a proximal end, and a closed distal end. The metal sheath 2 accommodates the thermocouple wires 3 without contact between the thermocouple wires 3 and a cylindrical inner surface of the metal sheath 2 and contact between the thermocouple wires 3 excluding the temperature measuring part 4, a proximal end portion 3b of each of the thermocouple wires 3 being beyond the opening 20 at the proximal end. The inorganic insulating material powder 5 is filled in an internal space of the metal sheath 2 excluding a proximal end portion of the metal sheath 2.

The metal sheath resin seal 60 is a resin filled in the proximal end portion of the metal sheath 2 where no inorganic insulating material powder 5 is filled, the metal sheath resin seal 60 tightly sealing the opening 20 at the proximal end of the metal sheath while allowing the thermocouple wires 3 to pass therethrough. The compensation lead wires 9 have leading ends respectively connected to proximal ends of the corresponding thermocouple wire 3 to form a connection portion 3a. The metal sleeve 7 has a cylindrical shape having a distal end portion defining a connecting section connected with an outer peripheral surface of the metal sheath 2, and allowing leading end portions of the compensation lead wires 9 extending out of insulative covers 92, a portion of the metal sheath 2 closer to the proximal end than a connecting section connected with the metal sleeve 7, and proximal end portions 3b of the thermocouple wires 3 to be in an internal space of the metal sleeve 7. The proximal end portions 3b of the thermocouple wires 3 and the leading end portions of the compensation lead wires 9 lie without contact with a cylindrical inner surface 7c and contact between themselves excluding the connection portions 3a between the thermocouple wires 3 and the compensation lead wires 9. The resin filler part 80 is a resin filled in the internal space of the metal sleeve 7.

Sheathed thermocouples have two types, i.e., an ungrounded type of thermocouple shown in FIG. 4 and a grounded type of thermocouple. The ungrounded type of thermocouple includes a pair of thermocouple wires having distal ends joined to each other at a joining section to form a temperature measuring part, the joining section being in inorganic insulating material powder at a distal end portion of the metal sheath as shown in the drawing. In contrast, the grounded type of thermocouple includes a pair of thermocouple wires having distal ends connected to a bottom portion at a distal end of the metal sheath, the distal end of the metal sheath serving as a temperature measuring part. It is seen from these perspectives that a temperature measuring part usually locates at a distal end portion of a sheathed thermocouple in either case.

Regarding the number of thermocouple wires to be accommodated in a metal sheath, a sheathed thermocouple including a pair of thermocouple wires accommodated in a sheath, like the one described above, is known the best as a single-element sheathed thermocouple. However, a sheathed thermocouple may include two or more pairs of thermocouple wires accommodated in a sheath.

Meanwhile, when the air enters the metal sheath of the sheathed thermocouple, water contained in the air deteriorates the insulation of the inorganic insulating material powder, which results in a temperature measurement error. Besides, oxygen contained in the air having entered the metal sheath is likely to oxidize the periphery of the temperature measuring part of the thermocouple wires if an object to be measured has a high temperature and a distal end portion of the sheathed thermocouple where the temperature measuring part locates has a high temperature. The oxidation causes a temperature measurement error as well. Therefore, the opening at the proximal end of the metal sheath is required to be tightly sealed to avoid the temperature measurement error. The metal sheath resin seal 60 fulfils the tight sealing in the sheathed thermocouple 10 shown in FIG. 4.

The resin filler part in the metal sleeve performs additional prevention of keeping the air from entering. However, the metal sleeve has a larger diameter than the metal sheath. This causes a difference between a thermal expansion of the metal sleeve and that of the resin filler part, and a gap is therefore likely to come into existence between the metal sleeve and the resin filler part. Further, a crack is likely to occur in the resin filler part. However, the metal sheath resin seal can be said to basically ensure the tight sealing of the opening at the proximal end of the metal sheath. Accordingly, there is no likelihood that the trouble such as occurrence of a temperature measurement error owing to the resin filler part.

Moreover, since the thermocouple wire has a small diameter, the proximal end portions of the thermocouple wires extending out of the metal sheath are highly likely to be broken off by an external force. Moreover, a metal sheath external lead wire (hereinafter, the "metal sheath external lead wire" means a section where a proximal end portion of the thermocouple wire lying outside the metal sheath and a leading end portion of the compensation lead wire extending out of the insulative cover connected with the proximal end portion of the thermocouple wire lie) is likely to damage a thermoelectromotive signal and then cause a temperature measurement error when a contact between the wires or a contact between the wire and a peripheral conductive member occurs. To avoid the wire breaking or errors, it is necessary to surround the metal sheath external lead wire by insulative material, and hold the metal sheath external lead wire at a specific position where the wires will not come into contact with each other to accomplish the prevention of mutual contact and protection of the wires from the external force and the peripheral conductors (hereinafter, the prevention and protection are referred to as "protection of metal sheath external lead wire"). The metal sleeve 7 and the resin filler part 80 fulfill the prevention and protection in the sheathed thermocouple 10 shown in FIG. 4.

In addition to the sheathed thermocouple shown in FIG. 4, although not being in general use, there have been: a sheathed thermocouple which protects a metal sheath external lead wire only by a resin without a metal sleeve; a sheathed thermocouple in which, as disclosed in Patent Literature 1, a metal sheath is filled with inorganic insulating material powder up to a proximal end in place of a resin seal for a metal sheath, and coated with a glass on the proximal end to tightly seal the proximal opening of the metal sheath, and a metal sleeve is filled with inorganic insulating material powder excluding a proximal end portion thereof in place of a resin filler part, and the proximal end portion of the metal sleeve is filled with a resin such as epoxy and silicon rubber: and a sheathed thermocouple in which, as shown in Patent Literature 2, a metal sleeve is filled with inorganic insulating material powder excluding a proximal end portion thereof in place of a resin seal for metal sheath, and the proximal end portion of the metal sleeve is filled with a glass.

CITATION LIST

Patent Literature

Patent Literature 1: Japanese Unexamined Patent Publication No. HEI 11-166867; and
Patent Literature 2: Japanese Patent No. 5420809

SUMMARY OF INVENTION

Resins are vulnerable to radioactive rays, and thus are more rapidly deteriorated than inorganic materials such as a metal under a radioactive environment. Use of the conventional sheathed thermocouple shown in FIG. 4 in a high radioactive environment brings a problem that tight sealing of an opening at a proximal end of a metal sheath will be worsen shortly due to deterioration of a resin seal for the metal sheath and a resin of a resin filler part in a metal sleeve, and the air containing water enters the metal sheath to involve a decreased insulation which causes a temperature measurement error. Another problem is that the rapid deterioration of the resin filler part in the metal sleeve lowers the protection of a metal sheath external lead wire shortly.

Furthermore, a device to be used in the vacuum is required to adopt a material having an extremely low gas discharge to increase the vacuum degree. However, the resins have a higher gas discharge than the inorganic materials such as metals. Thus, there is the problem that the conventional sheathed thermocouple shown in FIG. 4 is unsuitable for use in a vacuum environment due to the gas discharge of the resin filler part in the metal sleeve.

The same problems are seen in the aforementioned sheathed thermocouple including the metal sheath external lead wire protected only by the resin.

Use of the sheathed thermocouple disclosed in Patent Literature 1 in a high radioactive environment brings a problem that the resin in the proximal end portion of the metal sleeve deteriorates, and the air containing water enters the metal sleeve to involve a decreased insulation of the inorganic insulating material powder in the metal sleeve, that is, worse insulation between the metal sheath external lead wire, which causes a temperature measurement error shortly. Besides, use of the sheathed thermocouple in a vacuum environment brings another problem in connection with a gas discharge from the resin in the proximal end portion of the metal sleeve similarly to the sheathed thermocouple shown in FIG. 4. In addition, a colossal and complex apparatus having robotic characteristics is required in a process of coating the unenclosed proximal end of the metal sheath with a glass having fluidity after being heated and softened. Hence, the sheathed thermocouple shown in FIG. 4 has been widely manufactured and used because of the existence of this problem.

Moreover, the sheathed thermocouple disclosed in Patent Literature 2 has, as the above-described sheathed thermocouple shown in FIG. 4, the problem that the tightness between the metal sleeve and the glass in the proximal end portion thereof is likely to deteriorate and cause a gap due to a thermal expansion difference therebetween because the metal sleeve has a larger diameter than the metal sheath, and no provision of any metal sheath resin seal makes it difficult to provide a way of preventing the air containing water from entering the metal sleeve and the metal sheath even at a room temperature after the sheathed thermocouple is used in a high temperature environment as well as a high radioactive environment or vacuum environment, and the water contained in the air deteriorates the insulation of the inorganic insulating material powder in the metal sleeve and the metal sheath, which highly leads to occurrence of a temperature measurement error.

The present invention has been accomplished in view of the above-mentioned problems, and has an object of providing a sheathed thermocouple and a method for manufacturing the sheathed thermocouple, the sheathed thermocouple which can eliminate, even when used in a high radioactive environment, the problems that insulation of inorganic insulating material powder contained in a metal sheath and a filler contained in a metal sleeve deteriorate shortly, and protection of the metal sheath external lead wire deteriorates shortly, and which can has a decreased gas discharge even when used in a vacuum environment.

The invention described below has been found out to achieve the object.

A sheathed thermocouple according to a first aspect of the present invention includes: at least a pair of thermocouple wires having distal ends joined to each other to form a temperature measuring part; a metal sheath having a cylindrical shape having an opening at a proximal end and a closed distal end, the metal sheath accommodating the thermocouple wires without contact between the thermocouple wires and a cylindrical inner surface and contact between the thermocouple wires excluding the temperature measuring part, and a proximal end portion of each of the thermocouple wires being beyond the opening; inorganic insulating material powder filled in an internal space of the metal sheath excluding a proximal end portion of the metal sheath; a glass seal part made of a glass and filled in the proximal end portion of the metal sheath where no inorganic insulating material powder is filled, the glass seal part tightly sealing the opening of the metal sheath while allowing the thermocouple wires to pass therethrough so that the respective proximal end portions of the thermocouple wires extend out of the metal sheath; at least a pair of compensation lead wires having leading ends each connected to a proximal end of the proximal end portion of each of the thermocouple wires; a metal sleeve having a cylindrical shape having a distal end portion defining a connecting section connected with an outer peripheral surface of the metal sheath, and allowing a portion of the metal sheath closer to the proximal end than the connecting section, the proximal end portion of each of the thermocouple wires and the leading ends of the compensation lead wires to be in an internal space, the proximal end portions of the thermocouple wires and the leading ends of the compensation lead wires lying without contact with a cylindrical inner surface and contact between themselves excluding connection portions between the thermocouple wires and the compensation lead wires; and a glass filler part made of a glass having a lower softening temperature than the glass seal part, and filling an internal space of the metal sleeve.

A method for manufacturing a sheathed thermocouple according to a second aspect of the present invention includes steps of: preparing a metal sheath accommodating a pair of thermocouple wires and inorganic insulating material powder filled up to a proximal end; forming a glass seal part by removing a fraction of the inorganic insulating material powder out of the metal sheath that has a predetermined depth from the proximal end, putting first glass powder in a cavity where the fraction of the inorganic insulating material powder has been removed, and heating the first glass powder up to a first glass softening temperature or higher to soften and integrate the first glass powder; connecting leading ends of compensation lead wires to proximal ends of the thermocouple wires; and forming a glass filler part by attaching a distal end portion of a metal sleeve to a proximal end portion of the metal sheath, putting second glass powder in an internal space of the metal sleeve, and heating the second glass powder up to a second glass softening temperature or higher that is lower than the first glass softening temperature to soften and integrate the second glass powder.

The foregoing, and the objects, features and advantages of the present invention will be clarified by the following descriptions and the accompanying drawings.

According to the present invention, it is possible to provide a sheathed thermocouple which can prevent the insulation of the insulative material in the metal sheath and the metal sleeve from deteriorating in a radioactive environment, and prevent the insulative material from discharging a gas in a vacuum environment. Moreover, the sheathed thermocouple can be used at a higher temperature than the conventional thermocouple. Additionally, the present invention makes it possible to manufacture a sheathed thermocouple having this configuration.

DESCRIPTION OF EMBODIMENTS

Figure 1A:
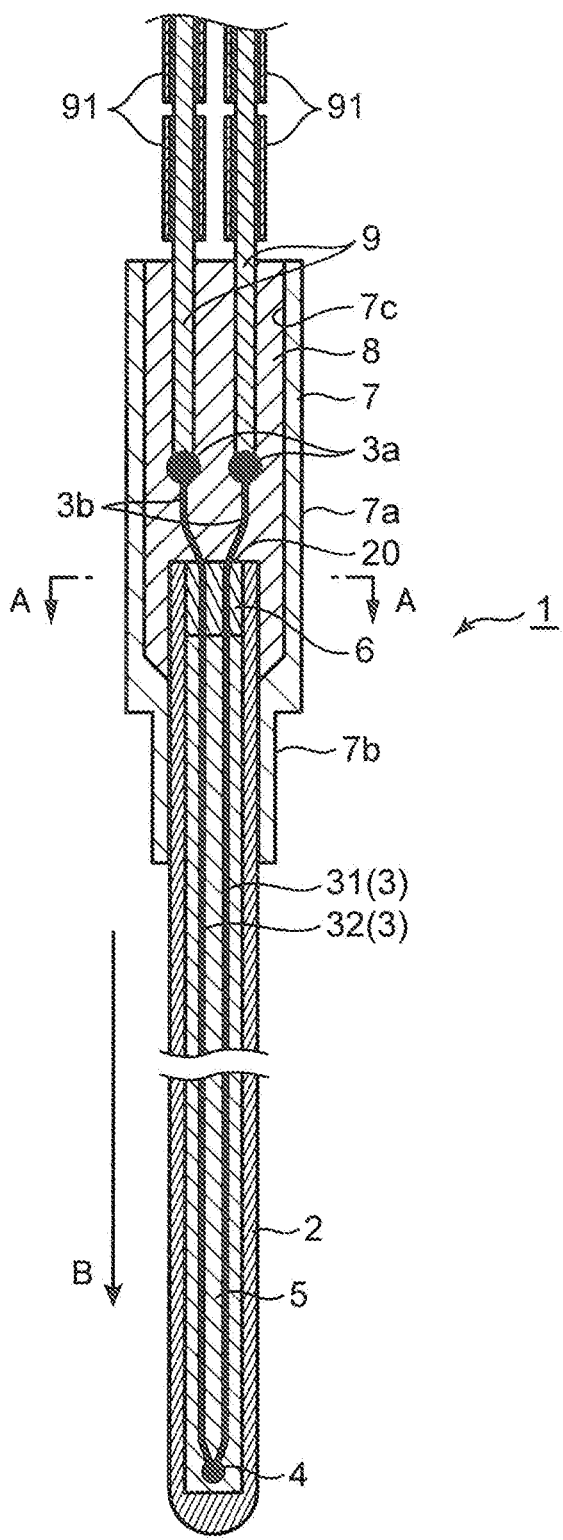
FIG. 1A is a longitudinal cross-sectional view of a sheathed thermocouple according to a first embodiment of the present invention.

Hereinafter, sheathed thermocouples according to embodiments of the present invention will be described with reference to the accompanying drawings. It should be noted that the dimensions of the structural components shown in the drawings do not perfectly follow actual dimensions and dimensional ratios of these components.

First Embodiment

Figure 1B:
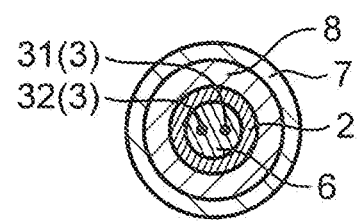
FIG. 1B is a cross sectional view taken along the line A-A in FIG. 1A.

FIG. 1A is a longitudinal cross-sectional view of a sheathed thermocouple according to a first embodiment of the present invention. FIG. 1B is a transverse cross-sectional view taken along the line A-A in FIG. 1A. The direction B denoted by the arrow in FIG. 1A is a direction from a proximal end portion to a distal end portion of each component of a sheathed thermocouple 1. This definition of the direction should be applied to FIGS. 2 and 3 as well. Further, in FIG. 1, the structural components that are substantially the same as those shown in FIG. 4 are given with the same reference signs. This way is similarly applied to corresponding components in all the figures of FIGS. 1 to 4.

As shown in FIG. 1, the sheathed thermocouple 1 in this embodiment includes: a pair of thermocouple wires 3, specifically, a positive thermocouple wire 31 and a negative thermocouple wire 32; a metal sheath 2; inorganic insulating material powder 5; a glass seal part 6; a pair of compensation lead wires 9 which transmit a thermally electromotive force of the thermocouple wires 3 to a measurement receiver; a metal sleeve 7; and a glass filler part 8.

The pair of thermocouple wires 3 have distal ends joined to each other to form a temperature measuring part 4. The metal sheath 2 includes an opened proximal end, and has a cylindrical shape having an opening 20 at the proximal end and a closed distal end. The metal sheath 2 accommodates the thermocouple wires 3 without contact between the thermocouple wires 3 and a cylindrical inner surface of the metal sheath 2 and contact between the thermocouple wires 3 excluding the temperature measuring part 4, a proximal end portion 3b of each of the thermocouple wires 3 being beyond the opening 20. The inorganic insulating material powder 5 is filled in an internal space of the metal sheath 2 excluding a proximal end portion of the metal sheath 2.

The thermocouple wires 3 are kept away from the inner surface of the metal sheath 2 by the inorganic insulating material powder 5 without any contact with the inner surface of the metal sheath 2. Similarly, the thermocouple wires 3 are kept away from each other by the inorganic insulating material powder 5 without any contact with each other excluding the temperature measuring part 4.

The glass seal part 6 is filled in the proximal end portion of the metal sheath 2 where no inorganic insulating material powder 5 is filled, the glass seal part 6 tightly sealing the opening 20 of the metal sheath 2 while allowing the thermocouple wires 3 to pass therethrough, and the proximal end portion 3b extending out of the metal sheath 2. The compensation lead wires 9 have leading ends each connected to a proximal end of the thermocouple wire 3. The metal sleeve 7 has a cylindrical shape having a distal end portion defining a connecting section connected with an outer peripheral surface of the metal sheath 2, and allows a portion of the metal sheath 2 closer to the proximal end than the connecting section, the proximal end portions 3b of the thermocouple wires 3, and the leading end portions of the compensation lead wires 9 to be in the internal space of the metal sleeve 7. The proximal end portions 3b of the thermocouple wires 3 and the leading end portions of the compensation lead wires 9 are kept away from a cylindrical inner surface 7c of the metal sleeve 7 by the glass filler part 8 without any contact with the inner surface 7c. Similarly, each of the thermocouple wires 3 and the corresponding compensation lead wire 9 are kept away from each other by the glass filler part 8 without any contact therebetween excluding a connection portion 3a. The glass filler part 8 is made of a glass having a lower softening temperature than the glass seal part 6, and filling an internal space of the metal sleeve 7.

The sheathed thermocouple 1 represents an ungrounded type of single-element thermocouple including the pair of thermocouple wires 3, and the temperature measuring part 4 contained in the inorganic insulating material powder 5 at the distal end portion of the metal sheath 2. However, it may be applied to a sheathed thermocouple including two or more pairs of thermocouple wires, or a grounded type of sheathed thermocouple.

The glass seal part 6 tightly seals the opening 20 of the metal sheath 2, thereby preventing the air from entering the metal sheath 2. The glass filler part 8 exerts the tight sealing as well. However, the metal sleeve 7 has a larger diameter than a metal sheath 2. This causes a difference between a thermal expansion of the metal sleeve 7 and that of the glass filer part 8. A gap is therefore likely to come into existence between the metal sleeve 7 and the metal sheath 2 at the time of heating. However, the glass seal part 6 can be said to basically prevent the air from entering the metal sheath 2. Accordingly, there is no likelihood that the air having entered the metal sleeve 7 causes a trouble such as occurrence of a temperature measurement error, because the metal sheath external lead wire is surrounded by the glass filler part 8.

The metal sleeve 7 and the glass filler part 8 accomplish prevention of the proximal end portions 3b of the thermocouple wires 3 extending out of the metal sheath 2 from breaking-off caused by an external force, and prevention of mutual contact between the connections of the proximal end portions 3b and the leading end portions of the compensation lead wires 9 and contact with the metal sleeve 7. This protects the metal sheath external lead wire.

The glass filler part 8 includes: a retaining section which retains the proximal end portions 3b of the thermocouple wires 3 and the leading end portions of the compensation lead wires 9 at a distance away from each other; and a coating section which coats and keeps the retaining section from coming into contact with water contained in the air having entered the metal sleeve 7. In this embodiment, the retaining section covers the proximal end portion of the metal sheath 2, thereby performing additional prevention of keeping the air from entering the metal sheath 2. Further, the retaining section and the coating section are integrally formed.

Glasses that are inorganic are durable against radioactive rays, and thus are less likely to be rapidly deteriorated even when receiving the radioactive rays, unlike resins. Hence, the sheathed thermocouple 1 in this embodiment adopting a glass in place of a resin is usable for a longer time than a conventional sheathed thermocouple even in a high radioactive environment. Accordingly, it is possible to remarkably reduce the number of replacements with a new thermocouple. The glass has extremely lower gas discharge than a resin in the vacuum. Accordingly, the proximal end of the thermocouple in this embodiment can eliminate the problem of requiring degassing even if it is used in the vacuum.

In forming of the glass seal part 6, first, glass powder is put in a cavity where a fraction of the inorganic insulating material powder 5 has been removed from the proximal end portion of the metal sheath 2, and then the glass powder is heated up to a glass softening temperature or higher to be integrated into a glass. The integrated glass has a decreased volume in accordance with a decreased air volume among the glass powder particles after the glass powder is changed to the integrated glass. Subsequently, a predetermined amount of glass powder is added, and is then heated up to the glass softening temperature or higher, thereby forming an integrated glass having an increased volume. The sequence of operations is repeated under a strict temperature control to achieve the glass seal part 6 having the state shown in FIG. 1. Consequently, the forming of the glass seal part 6 is completed. Similarly to the forming of the glass seal part 6, the glass filler part 8 is formed by repeatedly executing a sequence of putting glass powder in an internal space or a cavity of the metal sleeve 7 and heating the glass powder up to a glass softening temperature or higher under a strict temperature control. Consequently, the forming of the glass filler part 8 shown in FIG. 1 is completed. It should be noted here that the term "glass softening temperature" means a temperature at which a glass starts softening prominently by its own weight when being heated. The temperature is also called as a Littleton point.

Specifically, a sheathed thermocouple according to this embodiment can be manufactured by the steps described below. First, a metal sheath 2 accommodating a pair of thermocouple wires 3 and filled with inorganic insulating material powder 5 up to a proximal end is prepared. Then, a glass seal part 6 is formed by removing a fraction of inorganic insulating material powder 5 out of the metal sheath 2 that has a predetermined depth from the proximal end of the metal sheath 2, putting first glass powder in a cavity where the fraction of the inorganic insulating material powder has been removed, and heating the first glass powder up to a first glass softening temperature or higher to soften and integrate the first glass powder. In this case, gaps between glass powder particles become narrower due to the softening of the first glass powder, a top surface of the integrated glass then lowers from the proximal end of the metal sheath 2, and thus another cavity comes into existence at the proximal end portion of the metal sheath 2. A predetermined amount of the first glass powder is additionally put in the cavity having come into existence at the proximal end portion of the metal sheath 2 due to the softening of the first glass powder, and the first glass powder is heated up to the first glass softening temperature or higher to be soften and integrated with the already integrated glass. The sequence of putting and heating the first glass powder is repeated to integrate the glass up to the proximal end of the metal sheath 2. In this manner, the glass seal part 6 is formed. At each time, it is preferable to put the first glass powder to reach the proximal end of the metal sheath 2.

Subsequent to the forming of the glass seal part 6, the leading ends of the compensation lead wires 9 are connected to proximal ends of thermocouple wires 3. Further, a glass filler part 8 is formed by attaching a distal end portion of a metal sleeve 7 to the proximal end portion of the metal sheath 2, putting second glass powder having a second glass softening temperature that is lower than the first glass softening temperature in an internal space of the metal sleeve 7, and heating the second glass powder up to the second glass softening temperature or higher and lower than the first glass softening temperature to soften and integrate the second glass powder into a glass. In this case, since a cavity comes into existence at the proximal end portion of the metal sleeve 7 due to the softening of the second glass powder, a predetermined amount of the second glass powder is additionally put in the cavity, and heated up to the second glass softening temperature and higher to be softened and integrated with the already integrated glass. A sequence of inputting and heating the second glass powder is repeated to integrate the glass up to the proximal end of the metal sleeve 7. In this manner, the glass filler part 8 is formed. It is possible to manufacture a sheathed thermocouple by the above-described steps in this embodiment. At each time, it is preferable to put the second glass powder to reach the proximal end of the metal sleeve 7.

Methods of forming the glass seal part 6 and the glass filler part 8 should not be limited to the above-described methods. As shown in FIG. 1, a proximal end of the glass seal part 6 is substantially flush with the opening 20 at the proximal end of the metal sheath 2, and a proximal end of the glass filler part 8 is substantially flush with an opening at the proximal end of the metal sleeve 7. However, the proximal end of the glass seal part 6 may be at a position retracted in the metal sheath 2 that is lower than the opening 20, or a position projected beyond the opening 20. This positional relationship can be applied to the positional relationship between the proximal end of the glass filler part 8 and the opening at the proximal end of the metal sleeve 7.

According to the configuration of the sheathed thermocouple 1 in this embodiment, the glass seal part 6 is firstly formed, and subsequently, the glass filler part 8 is formed. The glass of the latter part has a lower softening temperature than the glass of the former part. In other words, the glass constituting the glass filler part 8 has a lower softening temperature than the glass constituting the glass seal part 6. Therefore, the way that the glass filler part 8 is formed by setting the heat temperature at not less than the glass softening temperature of the glass filler part 8 and lower than the glass softening temperature of the glass seal part 6 will be seen to eliminate a problem that the glass seal part 6 softens, and then a gap comes into existence between the glass seal part 6 and the internal surface of the metal sheath 2, and the tight sealing at the opening 20 of the metal sheath 2 consequently deteriorates. However, if some reduction in the manufacturing yield is acceptable, the glass seal part 6 and the glass filler part 8 may be made of a glass material having the same softening temperature, that is, these parts may be made of the same glass material.

The metal sleeve 7 has a cylindrical shape, and includes a cylindrical main body section 7*a* at the proximal end portion and a cylindrical connecting section 7*b* at the distal end portion, the cylindrical connecting section 7*b* having a smaller diameter than the cylindrical main body section 7*a*. The proximal end portion of the metal sheath 2 is inserted through to lie in the distal end portion of the metal sleeve 7 from the distal end thereof. In this manner, the metal sleeve 7 and the metal sheath 2 are connected with each other at the cylindrical connecting section 7*b* of the metal sleeve 7 by caulking. The connection may be made by welding or brazing in place of caulking.

The compensation lead wires 9 extending out of the metal sleeve 7 are passed through a series of short tube-shaped insulator pieces 91 each made of non-porous ceramic to keep a transmitted thermoelectromotive signal from being damaged by a contact with any conductor in a wiring route. The series of short tube-shaped insulator pieces 91 is effective for laying on a curved wiring route. Furthermore, the insulator piece 91 is durable against radioactive rays owing to the ceramic, and requires an extremely less degassing in the vacuum owing to the non-porousness.

The material and dimension of each main component will be described. For example, the metal sheath 2 may be made of Inconel (registered trademark) 600 and have a diameter of 2 mm. The metal sleeve 7 may be made of SUS 304 and include the cylindrical main body section 7*a* having a diameter of 6 mm and a length of 25 mm. The glass seal part 6 may be made of a glass having a softening temperature of approximately 760° C. The glass filler part 8 may be made of a glass having a softening temperature of approximately 410° C. The inorganic insulating material powder 5 may be made of magnesia.

The components should not be limited to these materials. For instance, the metal sheath 2 may be made of austenite-based stainless, and the metal sleeve 7 may be made of Inconel 600 identical to that of the metal sheath 2. Generally, glasses have a smaller thermal expansion coefficient than metals. However, the thermal expansion coefficient of the glass, in particular, the glass for the glass seal part 6 is preferable to be as high as possible in order to reliably prevent the air from entering the metal sheath 2.

Each component should not be limited to the aforementioned dimension as well. For example, even if a glass having a high thermal expansion coefficient is adopted for the glass seal part 6, there is a high likelihood that in the case of the metal sheath 2 having a large diameter, when being heated, a thermal expansion difference between the metal sheath 2 and the glass seal part 6 increases to deteriorate the tightness therebetween and a gap comes into existence, causing the air to enter the metal sheath 2 and a temperature measurement error. Additionally, if the diameter of the metal sheath 2 is too small, it is difficult to form the glass seal part 6 and attach the metal sleeve 7 to the metal sheath 2. In view thereof, it is preferable that the diameter of the metal sheath 2 is 1.1 mm to 3.2 mm.

Second Embodiment

Figure 2:
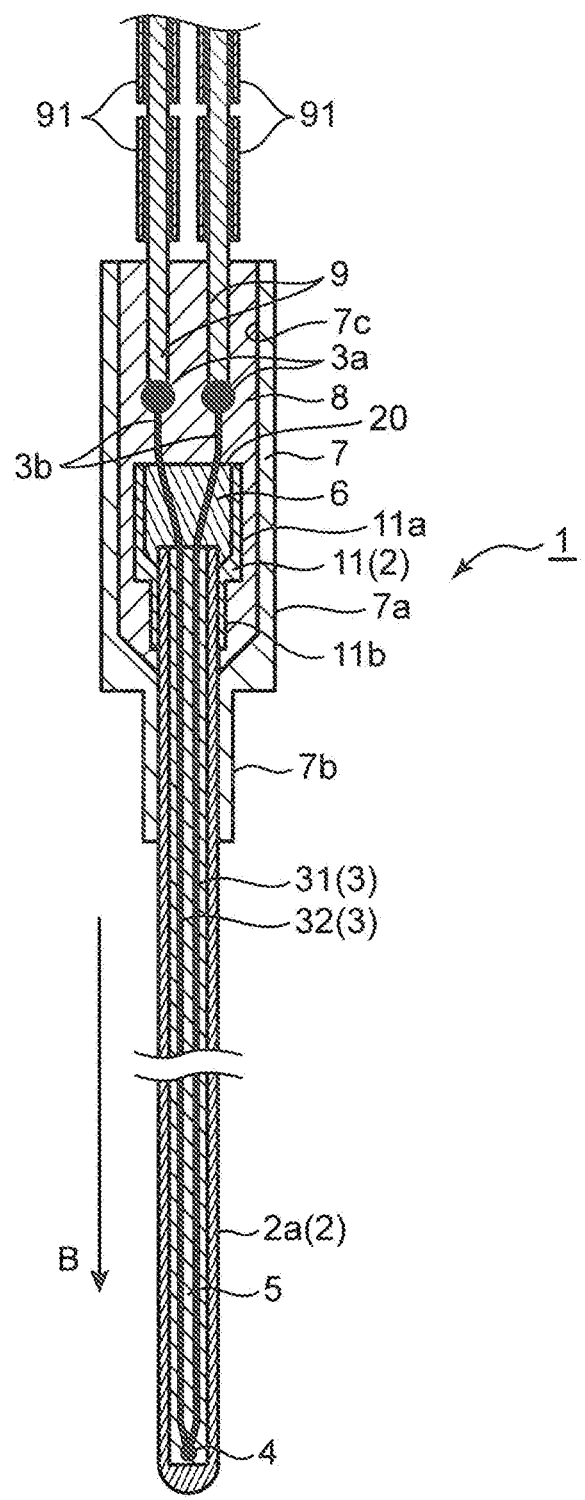
FIG. 2 is a longitudinal cross-sectional view of a sheathed thermocouple according to a second embodiment of the present invention.

FIG. 2 is a longitudinal cross-sectional view of a sheathed thermocouple according to a second embodiment of the present invention. A transverse cross-sectional view (radial cross-sectional view) of the sheathed thermocouple 1 according to this embodiment is omitted since the components are point-symmetric to each other across a central axis in the same manner as the first embodiment except thermocouple wires 3 and compensation lead wires 9. Further, in FIG. 2, the structural components that are substantially the same as those shown in FIG. 1 are given with the same reference signs, and thus the descriptions of the components will be omitted.

The second embodiment differs from the first embodiment in that a proximal end portion of a metal sheath 2 defines a first expansion section 11 having a larger inner diameter than a remaining section thereof. A glass seal part 6 is filled in the first expansion section 11.

As shown in FIG. 2, the metal sheath 2 includes the first expansion section 11 and the remaining section, i.e., a metal sheath core section 2*a*, having a uniform diameter. The first expansion section 11 has a cylindrical shape, and includes a body portion 11a at a proximal end and a cylindrical connection portion 11b at a distal end of the body portion 11a, the cylindrical connection portion 11b having a smaller diameter than the body portion 11a. A proximal end portion of the metal sheath core section 2a is inserted through to lie in the first expansion section 11 from the distal end thereof. In this manner, the first expansion section 11 and the metal sheath core section 2a are connected with each other at the connection portion 11b of the first expansion section 11 by caulking. The connection may be made by welding or brazing in place of caulking.

For example, if the metal sheath core section 2a has a small diameter of 1 mm or smaller in the sheathed thermocouple according to the first embodiment including no first expansion section 11, it is difficult, in the forming of the glass seal part 6, to put the glass powder in a cavity where a fraction of the inorganic insulating material powder 5 has been removed from the proximal end portion of the metal sheath core section 2a. In contrast, the second embodiment has the feature of ensuring a larger radial space to include the glass seal part 6 owing to the first expansion section 11, which thus facilitates the forming of the glass seal part 6 even for the metal sheath core section 2a having a small diameter.

The material and dimension of each main component will be described. For example, the first expansion section 11 and the metal sheath core section 2a may be made of SUS 304. The metal sheath core section 2a may have a diameter of 1 mm. The body portion 11a of the first expansion section 11 may have a diameter of 1.6 mm and a length of 2.5 mm. The metal sleeve 7 may be made of SUS304, and the cylindrical mail body section 7a thereof may have a diameter of 5 mm and a length of 25 mm. The same glass as that used in the first embodiment is adoptable for each of the glass seal part 6 and the glass filler part 8.

Apparently, each component should not be limited to the aforementioned material and the dimension. For example, the thermal expansion coefficient of the glass, in particular, the glass for the glass seal part 6 is preferable to be as high as possible similarly to the first embodiment. Even if a glass having a high thermal expansion coefficient is adopted for the glass seal part 6, there is a high likelihood that in the case of the body portion 11a of the first expansion section 11 having a large diameter, when being heated, a thermal expansion difference between the main body portion 11a of the first expansion section 11 and the glass seal part 6 increases to deteriorate the tightness therebetween and a gap comes into existence, causing the air to enter the metal sheath and a temperature measurement error. Additionally, if the diameter is too small, it is uneasy to put the glass in the forming of the glass seal part 6. In view thereof, it is preferable that the diameter of the body portion 11a of the first expansion section 11 is 1.1 mm to 3.2 mm. The first embodiment is adoptable in the case of the metal sheath core section 2a having a diameter of 1.1 mm or larger. The second embodiment is more suitable in the case of the metal sheath core section 2a having a smaller diameter of 0.8 mm to 1 mm since it is difficult to attach the metal sleeve 7 and the first expansion section 11 to the metal sheath core section 2a having the smaller diameter.

Remaining structures and features other than the above-described ones are the same as those of the first embodiment, and therefore, the descriptions therefor will be omitted.

Third Embodiment

Figure 3:
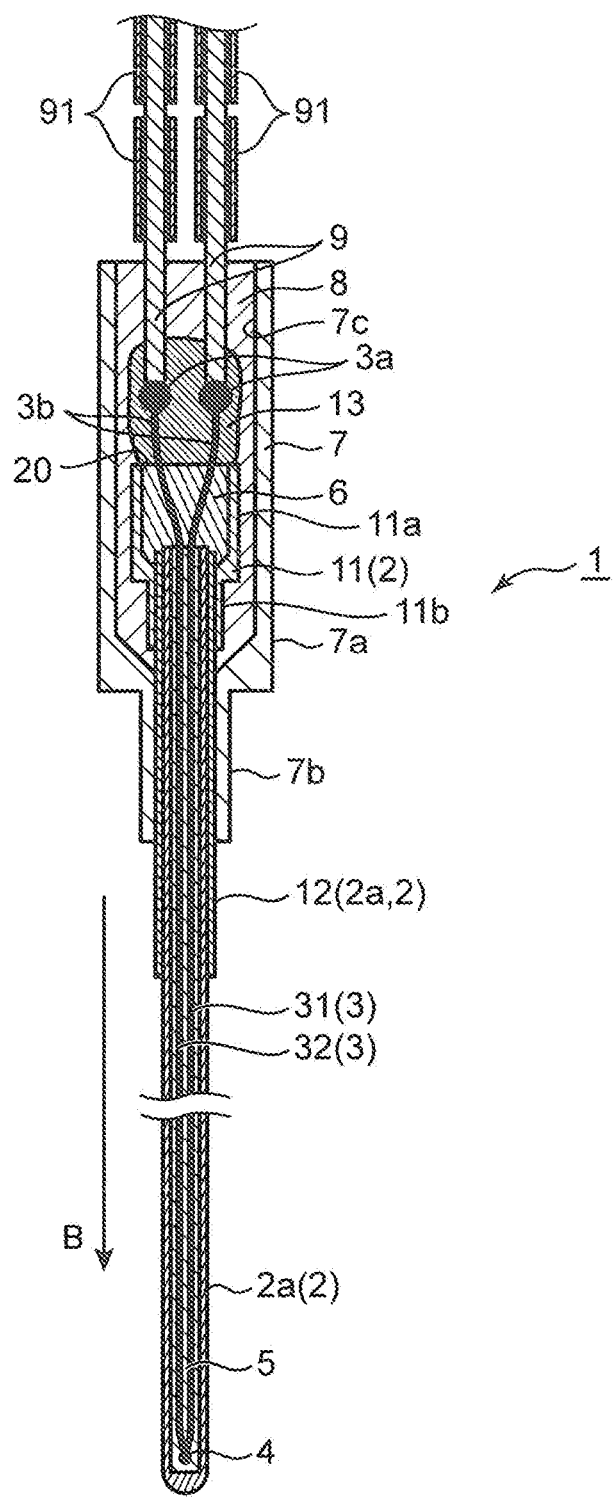
FIG. 3 is a longitudinal cross-sectional view of a sheathed thermocouple according to a third embodiment of the present invention.
Figure 4A:
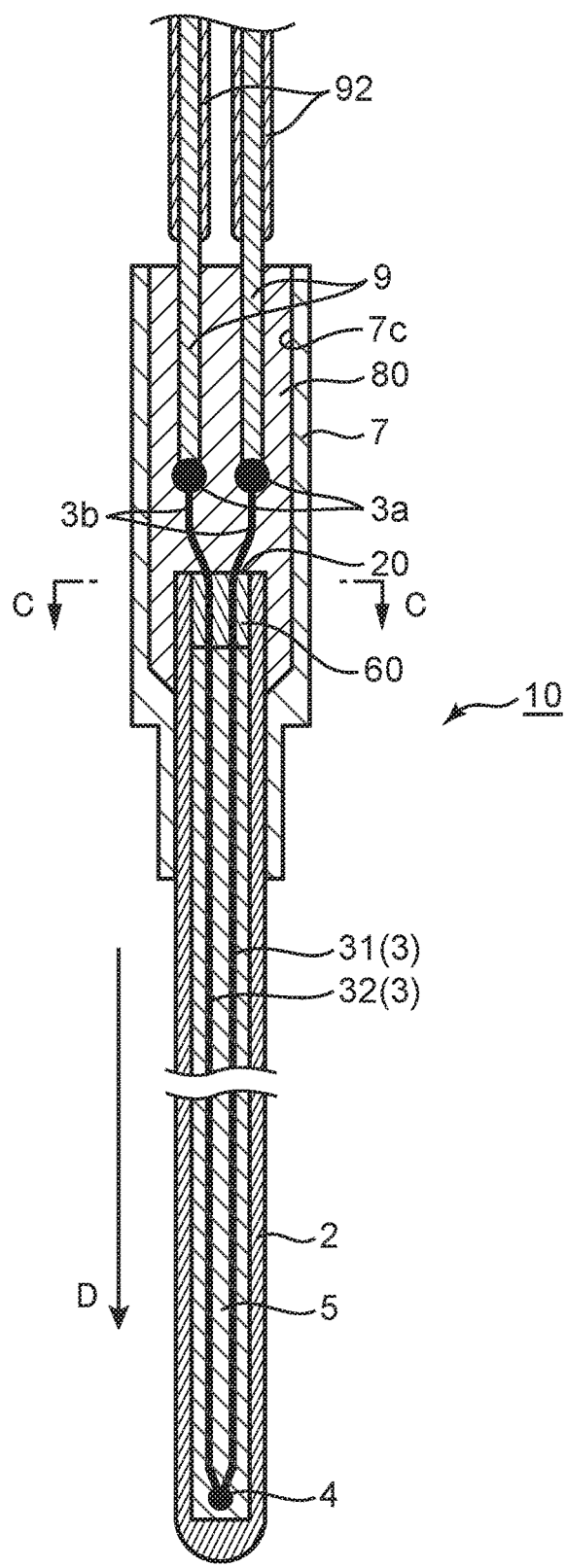
FIG. 4A is a longitudinal cross-sectional view of a most conventional sheathed thermocouple.
Figure 4B:
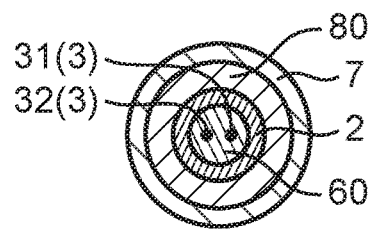
FIG. 4B is a cross sectional view taken along the line C-C in FIG. 4A.

FIG. 3 is a longitudinal cross-sectional view of a sheathed thermocouple according to a third embodiment of the present invention. A transverse cross-sectional view (radial cross-sectional view) of the sheathed thermocouple 1 according to this embodiment is omitted since the components are point-symmetric to each other across a central axis in the same manner as the first embodiment except thermocouple wires 3, compensation lead wires 9, and a ceramic adhesive 13. Further, in FIG. 3, the structural components that are substantially the same as those shown in FIG. 2 are given with the same reference signs, and thus the descriptions of the components will be omitted.

The third embodiment differs from the second embodiment in that (1) a metal sleeve 7 accommodates a ceramic adhesive 13 coating proximal end portions 3b of thermocouple wires 3 and connection portions 3a between the thermocouple wires 3 and the compensation lead wires 9, and contained in the glass filler part 8, and that (2) a metal sheath 2 includes a second expansion section 12 having a cylindrical shape and tightly covering an outer peripheral surface of the metal sheath 2 excluding a first expansion section 11 thereof, i.e., outer peripheral surface of a metal sheath core section 2a, and a cylindrical connecting section 7b of a metal sleeve 7 and a connection portion 11b of the first expansion section 11 of the metal sheath 2 are connected to the outer peripheral surface of the second expansion section 12 by caulking. The connection may be made by welding or brazing in place of caulking. Besides, the second expansion section 12 may be reliably fixed to the metal sheath core section 2a by caulking, welding, or brazing.

Regarding the difference (1), in the first and second embodiments, the metal sleeve 7 and the glass filler part 8 accommodated therein prevent the proximal end portions 3b of the thermocouple wires 3 extending out of the metal sheath 2 or the first expansion section 11 from being broken off due to an outer force. However, each of the thermocouple wires 3 is extremely narrow as the diameter of the metal sheath 2 is small. Accordingly, there is a likelihood that the proximal end portion 3b is broken off by a movement of the softened glass or a stress occurring in the solidification of glass into one body. To avoid the breaking-off of the thermocouple wires 3 in this embodiment, a region including the thermocouple wires 3 extending out of the metal sheath 2, and connection portions 3a between the proximal ends of the thermocouple wires 3 and the leading ends of the compensation lead wires 9 is fixedly coated with the ceramic adhesive 13 prior to forming of the glass filler part 8. After the ceramic adhesive 13 is dried, the metal sleeve 7 is attached to the sheath and the glass filler part 8 is formed. As being made of ceramic having a much higher melting point than a glass, the ceramic adhesive 13 is kept away from softening and liquefying at a temperature around the glass softening temperature of the glass filler part 8. Accordingly, there is no likelihood that even the narrow thermocouple wires 3 will be broken off in the forming of the glass filler part 8.

Meanwhile, a wire which is usually used as the compensation lead wire 9 has a diameter of about 0.8 mm, and is of a strand type. Hence, there is no concern about wire breaking in the forming. In contrast, the thermocouple wire 3 is made of a single wire, and has a diameter of about 0.5 mm in the case of the metal sheath core section 2a having a diameter of 3.2 mm, about 0.3 mm in the case of the metal sheath core section 2a having a diameter of 1.6 mm, 0.2 mm or smaller in the case of the metal sheath core section 2a having a diameter of 1.0 mm, and 0.1 mm or smaller in the case of the metal sheath core section 2a having a diameter of 0.5 mm. Particularly, if the metal sheath 2 has an extremely small diameter of less than 0.8 mm in the absence of the ceramic adhesive 13, the thermocouple wires 3 extending out of the metal sheath 2 are highly likely to be broken off in the forming.

The ceramic adhesive 13 is applied in a paste or liquid form, and thereafter is heated and dried to a solid. The ceramic adhesive 13 having been dried is porous, and thus may have a deteriorated insulative resistance if it adsorbs water in the air by a contact therewith. However, the dried ceramic adhesive 13 is contained in the glass filler part 8 without any contact with the air after the drying. In this way, deterioration in the insulative resistance is avoided. Note that glass once heated up to a softening temperature or higher is not porous.

As described above, the ceramic adhesive 13 keeps the proximal end portions 3b of the thermocouple wires 3 and the leading end portions of the compensation lead wires 9 away from each other. The glass filler part 8 covers the ceramic adhesive 13 and keeps the ceramic adhesive 13 away from the air.

Regarding the difference (2), the metal sheath 2 having such an extremely small diameter has a reduced thickness and a decreased strength. This makes it difficult to directly attach the cylindrical connecting section 7b of the metal sleeve 7 and the connection portion 11b of the first expansion section 11 of the metal sheath 2 to the metal sheath core section 2a of the metal sheath 2. However, this embodiment can eliminate the difficulty in attachment of the metal sleeve 7 and the first expansion section 11 to the second expansion section 12 of the metal sheath 2.

The material and the dimension of each main component will be described. For example, the second expansion section 12 of the metal sheath 2 may be made of SUS304 and have a diameter of 1 mm. The ceramic adhesive 13 having a heat resistance of 1000☐ or higher may be adoptable. Each of the remaining components may be made of the same material and have the same dimension as those exemplified in the second embodiment except the metal sheath 2 having a diameter of 0.5 mm.

To confirm the efficiency of the embodiment, performed was a test that a sheathed thermocouple 1 having the aforementioned materials and dimensions was immersed in water, and was applied with a hydraulic pressure of 0.1 MPa. As a result, it was confirmed that the glass seal part 6 and the glass filler part 8 normally kept working without any deterioration in the insulative resistance, and further were found to have no damage through an overhaul inspection.

Apparently, each component in the embodiment should not be limited to the aforementioned material and dimension. However, the thermal expansion coefficient of the glass of the glass seal part 6 is preferable to be as high as possible similarly to the first and second embodiments. Moreover, it is preferable that the diameter of the body portion 11a of the first expansion section 11 is 1.1 mm to 3.2 mm similarly to the second embodiment. The first or second embodiment having the simple structure is adoptable in the case of the metal sheath core section 2a having a diameter of 0.8 mm or larger. In contrast, the third embodiment is more suitable in the case of the metal sheath core section 2a having a diameter of 0.7 mm or smaller. It is preferable that the second expansion section 12 of the metal sheath 2 has a diameter of 0.8 mm or larger, which thus achieves a strength at least equivalent to that of the metal sheath core section 2a in the second embodiment.

Remaining structures and features other than the above-described ones are the same as those of the second embodiment, and therefore, the descriptions therefor will be omitted.

The sheathed thermocouple 1 according to each of the above-described first to third embodiments is a non-grounded type of single-element sheathed thermocouple. However, a modified grounded type of sheathed thermocouple may include thermocouple wires 3 constituted of a positive thermocouple wire 31 and a negative thermocouple wire 32 having distal ends connected to a bottom portion at a closed distal end of the metal sheath 2, the distal end of the metal sheath 2 serving as a temperature measuring part 4. Alternatively, the thermocouple may be a double-element type of thermocouple including two couples of thermocouple wires 3, or may include three or more couples.

Furthermore, the present invention is applicable to a sheath type of temperature sensor, such as a sheath type of temperature measuring resistor, including a metal sheath which accommodates temperature measuring wires and inorganic insulating material powder.

The present specification heretofore discloses the techniques of the various concepts, and hereinafter will summarize the main techniques among them.

(1) Sheathed Thermocouple According to a First Concept

A sheathed thermocouple according to a first concept of the present invention includes: at least a pair of thermocouple wires having distal ends joined to each other to form a temperature measuring part; a metal sheath having a cylindrical shape having an opening at a proximal end and a closed distal end, the metal sheath accommodating the thermocouple wires without contact between the thermocouple wires and a cylindrical inner surface and contact between the thermocouple wires excluding the temperature measuring part, and a proximal end portion of each of the thermocouple wires being beyond the opening; inorganic insulating material powder filled in an internal space of the metal sheath excluding a proximal end portion of the metal sheath; a glass seal part made of a glass and filled in the proximal end portion of the metal sheath where no inorganic insulating material powder is filled, the glass seal part tightly sealing the opening of the metal sheath while allowing the thermocouple wires to pass therethrough so that the respective proximal end portions of the thermocouple wires extend out of the metal sheath; at least a pair of compensation lead wires having leading ends each connected to a proximal end of the proximal end portion of each of the thermocouple wires; a metal sleeve having a cylindrical shape having a distal end portion defining a connecting section connected with an outer peripheral surface of the metal sheath, and allowing a portion of the metal sheath closer to the proximal end than the connecting section, the proximal end portion of each of the thermocouple wires and the leading ends of the compensation lead wires to be in an internal space, the proximal end portions of the thermocouple wires and the leading ends of the compensation lead wires lying without contact with a cylindrical inner surface and contact between themselves excluding connection portions between the thermocouple wires and the compensation lead wires; and a glass filler part made of a glass having a lower softening temperature than the glass seal part, and filling an internal space of the metal sleeve.

The sheathed thermocouple according to this concept is identical to the conventional thermocouple shown in FIG. 4 in the structure, but differs from the conventional thermocouple in that the glass seal part made of a glass is adopted in place of the resin seal for the metal sheath made of a resin to tightly seal the opening at the proximal end of the metal sheath, and that the glass filler part made of a glass is adopted in place of the resin filler part made of a resin as a filler to fill the internal space of the metal sleeve to protect the metal sheath external wire. Note that both the resin and the glass are insulative.

In this concept, the glass seal part at the proximal end portion of the metal sheath that has a smaller diameter than the metal sleeve and is less sensitive to a thermal expansion difference reliably prevents the air from entering the metal sheath. When a thermal expansion difference between a metal and a resin is compared with a thermal expansion difference between a metal and a glass, the latter is generally smaller. Thus, the tight sealing of the opening at the proximal end of the metal sheath of the sheathed thermocouple in this concept is never inferior to the tight sealing in the conventional thermocouple shown in FIG. 4. Moreover, there is no likelihood that the air enters the metal sleeve, and causes a trouble such as occurrence of a temperature measurement error owing to the glass filler part. Furthermore, the protection of the metal sheath external lead wire is accomplished by the metal sheath and the glass filler part.

Glasses that are inorganic are durable against radioactive rays like metals, and thus are less likely to be rapidly deteriorated even when receiving the radioactive rays, unlike resins. Hence, the sheathed thermocouple is usable for a longer time than the conventional sheathed thermocouple shown in FIG. 4 even in a high radioactive environment. Accordingly, it is possible to remarkably reduce the number of replacements with a new thermocouple. The glass has extremely lower gas discharge than a resin in the vacuum, and thus can be used even in the vacuum without any problem. Additionally, a glass generally has a higher heat resistance temperature than a resin. Accordingly, it is advantageous that the sheathed thermocouple in this concept can be used at a higher temperature than a conventional sheathed thermocouple adopting a typical resin.

In the forming of the glass seal part at the opening at the proximal end of the metal sheath, first, glass powder is put in a cavity where a fraction of the inorganic insulating material powder has been removed from the proximal end portion of the metal sheath, and then the glass powder is heated up to a glass softening temperature or higher to be integrated into a glass. The integrated glass has a decreased volume in accordance with a decreased air volume among the glass powder particles after the glass powder is changed to the integrated glass. Subsequently, a predetermined amount of glass powder is added, and is then heated up to the glass softening temperature or higher, thereby forming an integrated glass having an increased volume. The sequence of the operations is repeated to thereby complete the forming of the glass seal part. The present inventor has accomplished the glass seal part by this way under a strict control of a heat temperature. Similarly to the forming of the glass seal part, the forming of the glass filler part in the internal space of the metal sleeve is accomplished by the way of repeatedly executing a sequence of putting glass powder in the internal space or a cavity of the metal sleeve and heating the glass powder up to a glass softening temperature or higher under a strict control of a heat temperature. Apparently, ways of forming of the glass seal part and the glass filler part should not be limited to the above-described ways, and any other way is adoptable.

According to the configuration of the sheathed thermocouple in this concept, the glass seal part is firstly formed, and subsequently, the glass filler part is formed. Use of the glass having the lower softening temperature for the latter glass part than the softening temperature of the glass for the former glass part aims at avoiding a problem that, in the forming of the glass filler part, the glass seal part softens, and then a gap comes into existence between the glass part and the internal surface of the metal sheath, and the tight sealing at the opening of the metal sheath consequently deteriorates.

The aforementioned conventional sheathed thermocouple disclosed in Patent Literature 1 or 2 partly employs a glass for sealing. However, it is not that the tight sealer at the opening at the proximal end of the metal sheath and the filler in the internal space of the metal sheath are both made of a glass like the sheathed thermocouple of the present invention. Such a conventional sheathed thermocouple faces difficulty in use in a high radioactive environment and a vacuum environment, and further has a problem that a large manufacturing apparatus is required. Under the circumstances, the present inventor has made various efforts and found out that the aforementioned forming ways using glasses having different softening temperatures from each other make it possible to adopt one of the glasses for a tight sealer at an opening at a proximal end of a metal sheath and the other for a filler in an internal space of a metal sleeve by a heating device for softening a glass without any significant difference from adoption of a conventional resin. In this manner, the present inventor has achieved the sheathed thermocouple according to this concept that is suitable for use in a high radioactive environment and a vacuum environment, and is further industrially applicable.

Note that sheathed thermocouples according to second and third concepts to be described below have the same features as those of the first concept.

(2) Sheathed Thermocouple According to a Second Concept

A sheathed thermocouple according to a second concept of the present invention includes a metal sleeve which accommodates a ceramic adhesive coating at least the proximal end portions of the thermocouple wires, and the connection portions between the thermocouple wires and the compensation lead wires, and contained in the glass filler part, in addition to the sheathed thermocouple in the first concept.

In the sheathed thermocouple according to the first concept, the metal sleeve and the glass filler part contained in the metal sleeve prevent the narrow thermocouple wires extending out of the metal sheath from being broken off due to an outer force. However, if each of the thermocouple wires is extremely narrow, there is a likelihood that the wires are broken off by a movement of the softened glass or stress occurring in the solidification of the glass into one body during the forming of the glass filler part. In the second concept, a ceramic adhesive is provided to avoid the breaking-off of the thermocouple wires.

Specifically, since the ceramic adhesive provided prior to the forming of the glass filler part coats and thereby protects the thermocouple wires extending out of the metal sheath, the thermocouple wires are never broken off in the forming of the glass filler part. An exemplary way of forming the ceramic adhesive includes applying the ceramic adhesive in a paste or liquid form, and thereafter heating and drying the ceramic adhesive to a solid. As being made of ceramic having a much higher melting point than a glass, the ceramic adhesive is kept away from softening and liquefying at a glass softening temperature. Accordingly, the ceramic adhesive can be maintained in the stably solid state even during the forming of the glass filler part as well.

The ceramic adhesive having been dried is porous, and thus have a deteriorated insulative resistance if it adsorbs water contained in the air by a contact therewith. This may lead to occurrence of a temperature measurement error, and a gas discharge from pores in the vacuum. However, in the second concept, the ceramic adhesive enclosed in the glass filler part can eliminate these troubles.

(3) Sheathed Thermocouple According to a Third Concept

In a sheathed thermocouple according to a third concept of the present invention, the proximal end portion of the metal sheath is defined by a first expansion section having a larger inner diameter than other sections, in addition to the sheathed thermocouple according to the first and second concept.

As having a smaller diameter, the metal sheath has a much smaller inner diameter. In this case, it is uneasy to put glass powder in the proximal end portion of the metal sheath in the forming of the glass seal part of the sheathed thermocouple according to the first and second concepts. In contrast, the proximal end portion of the metal sheath in the third concept is defined by the first expansion section having a larger inner diameter. This configuration facilitates the putting of the glass powder. Accordingly, it is possible to relatively easily manufacture the sheathed thermocouple having the opening which is reliably and tightly sealed by the glass seal part at the proximal end of the metal sheet.

(4) Sheathed Thermocouple According to a Fourth Concept

In a sheathed thermocouple according to a fourth concept of the present invention, the metal sheath further includes a second expansion section having a cylindrical shape and tightly covering an outer peripheral surface of the metal sheath excluding the first expansion section, the metal sleeve and the first expansion section lying on an outer peripheral surface of the second expansion section, in addition to the sheathed thermocouple according to the third concept.

When a remaining section (hereinafter, referred to as "metal sheath core section") of the metal sheath in the third concept excluding the first expansion section has an extremely small diameter, the metal sheath core section has a reduced thickness and decreased strength. It is thus difficult to connect or attach the metal sleeve and the first expansion section to the metal sheath core section.

In the fourth concept, it is possible to connect the metal sleeve to the second expansion section. Therefore, the connection is achieved without any difficulty in the same manner as the operation for the metal sheath having a larger diameter. Moreover, the first expansion section is not attached to the metal sheath core section, but is attached to the second expansion section. In this way, the attachment is achieved without any difficulty in the same manner as the operation for the metal sheath having the larger diameter.

Furthermore, a method for manufacturing a sheathed thermocouple according to the present invention includes steps of: preparing a metal sheath accommodating a pair of thermocouple wires and filled with inorganic insulating material powder up to a proximal end; forming a glass seal part by removing a fraction of the inorganic insulating material powder out of the metal sheath that has a predetermined depth from the proximal end, putting first glass powder in a cavity where the fraction of the inorganic insulating material powder has been removed, and heating the first glass powder up to a first glass softening temperature or higher to soften and integrate the first glass powder; connecting leading ends of compensation lead wires to proximal ends of the thermocouple wires; and forming a glass filler part by attaching a distal end portion of a metal sleeve to a proximal end portion of the metal sheath, putting second glass powder in an internal space of the metal sleeve, and heating the second glass powder up to a second glass softening temperature or higher that is lower than the first glass softening temperature to soften and integrate the second glass powder.

This concept makes it possible to easily manufacture a sheathed thermocouple according to the present invention at a low cost.

It is preferable in the method for manufacturing a sheathed thermocouple according to the present invention that in the step of forming the glass seal part, a sequence of putting, heating and cooling the first glass powder is repeated a specified number of times to integrate the first glass powder up to the proximal end of the metal sheath, the sequence including: putting a predetermined amount of the first glass powder in the cavity where the fraction of the inorganic insulating material powder has been removed; and heating the first glass powder up to the first glass softening temperature or higher and cooling the first glass powder down to a predetermine temperature, and in the step of forming the glass filler part, a sequence of putting, heating and cooling the second glass powder is repeated a specified number of times to integrate the second glass powder up to the proximal end of the metal sleeve, the sequence including: putting a predetermined amount of the second glass powder in the internal space of the metal sleeve; and heating the second glass powder up to the second glass softening temperature or higher and cooling the second glass powder down to a predetermined temperature.

This application is based on Japanese Patent application No. 2019-078074 filed in Japan Patent Office on Apr. 16, 2019, the contents of which are hereby incorporated by reference.

Although the present invention has been appropriately and fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

DESCRIPTION OF REFERENCE SIGNS 1 sheathed thermocouple
2 metal sheath
2a metal sheath core section
3 thermocouple wires
3a connection portion (between thermocouple wires and compensation lead wires)
3b proximal end portion
4 temperature measuring part
5 inorganic insulating material powder
6 glass seal part
7 metal sleeve
7a cylindrical main body section
7b cylindrical connecting section
8 glass filler part
9 compensation lead wire
91 insulator piece
11 first expansion section
12 second expansion section
13 ceramic adhesive
20 opening at a proximal end (opening of the metal sheath)

The invention claimed is:
1. A sheathed thermocouple comprising:
at least a pair of thermocouple wires having distal ends joined to each other to form a temperature measuring part;

a metal sheath having a cylindrical shape having an opening at a proximal end and a closed distal end, the metal sheath accommodating the thermocouple wires without contact between the thermocouple wires and a cylindrical inner surface and contact between the thermocouple wires excluding the temperature measuring part, and a proximal end portion of each of the thermocouple wires being beyond the opening;

inorganic insulating material powder filled in an internal space of the metal sheath excluding a proximal end portion of the metal sheath;

a glass seal part made of a glass and filled in the proximal end portion of the metal sheath where no inorganic insulating material powder is filled, the glass seal part tightly sealing the opening of the metal sheath while allowing the thermocouple wires to pass therethrough so that the respective proximal end portions of the thermocouple wires extend out of the metal sheath;

at least a pair of compensation lead wires having leading ends each connected to a proximal end of the proximal end portion of each of the thermocouple wires;

a metal sleeve having a cylindrical shape having a distal end portion defining a connecting section connected with an outer peripheral surface of the metal sheath, and allowing a portion of the metal sheath closer to the proximal end than the connecting section, the proximal end portion of each of the thermocouple wires and the leading ends of the compensation lead wires to be in an internal space, the proximal end portions of the thermocouple wires and the leading ends of the compensation lead wires lying without contact with a cylindrical inner surface and contact between themselves excluding connection portions between the thermocouple wires and the compensation lead wires; and a glass filler part made of a glass having a lower softening temperature than the glass seal part, and filling an internal space of the metal sleeve.

2. A sheathed thermocouple according to claim 1, wherein the proximal end portion of the metal sheath is defined by a first expansion section having a larger inner diameter than other sections of the metal sheath.

3. A sheathed thermocouple according to claim 2, wherein the metal sheath further includes a second expansion section having a cylindrical shape and tightly covering an outer peripheral surface of the metal sheath excluding the first expansion section, the metal sleeve and the first expansion section lying on an outer peripheral surface of the second expansion section.

4. A sheathed thermocouple according to claim 1, further comprising:

a ceramic adhesive coating at least the proximal end portions of the thermocouple wires, and the connection portions between the thermocouple wires and the compensation lead wires, and contained in the glass filler part.

5. A sheathed thermocouple according to claim 4, wherein the proximal end portion of the metal sheath is defined by a first expansion section having a larger inner diameter than other sections of the metal sheath.

6. A sheathed thermocouple according to claim 5, wherein the metal sheath further includes a second expansion section having a cylindrical shape and tightly covering an outer peripheral surface of the metal sheath excluding the first expansion section, the metal sleeve and the first expansion section lying on an outer peripheral surface of the second expansion section.

7. A method for manufacturing a sheathed thermocouple, the method comprising steps of:

preparing a metal sheath accommodating a pair of thermocouple wires and filled with inorganic insulating material powder up to a proximal end;

forming a glass seal part by removing a fraction of the inorganic insulating material powder out of the metal sheath that has a predetermined depth from the proximal end, putting a first glass powder in a cavity where the fraction of the inorganic insulating material powder has been removed, and heating the first glass powder up to a first glass softening temperature or higher to soften and integrate the first glass powder;

connecting leading ends of compensation lead wires to proximal ends of the thermocouple wires; and forming a glass filler part by attaching a distal end portion of a metal sleeve to a proximal end portion of the metal sheath, putting a second glass powder in an internal space of the metal sleeve, and heating the second glass powder up to a second glass softening temperature or higher that is lower than the first glass softening temperature to soften and integrate the second glass powder.

8. A method for manufacturing a sheathed thermocouple according to claim 7, wherein in the step of forming the glass seal part, a sequence of putting, heating and cooling the first glass powder is repeated a specified number of times to integrate the first glass powder up to the proximal end of the metal sheath, the sequence including:

putting a predetermined amount of the first glass powder in the cavity where the fraction of the inorganic insulating material powder has been removed; and heating the first glass powder up to the first glass softening temperature or higher and cooling the first glass powder down to a predetermine temperature, and in the step of forming the glass filler part, a sequence of putting, heating and cooling the second glass powder is repeated a specified number of times to integrate the second glass powder up to the proximal end of the metal sleeve, the sequence including:

putting a predetermined amount of the second glass powder in the internal space of the metal sleeve; and heating the second glass powder up to the second glass softening temperature or higher and cooling the second glass powder down to a predetermined temperature.

* * * * *